Jan. 26, 1965    W. W. REDMER    3,167,085
FLOW REGULATING DEVICE
Filed Feb. 12, 1962
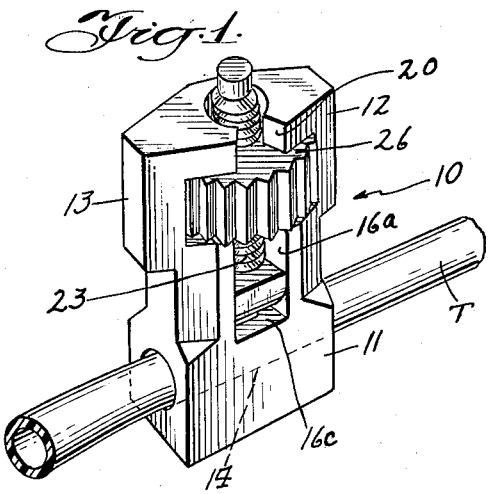
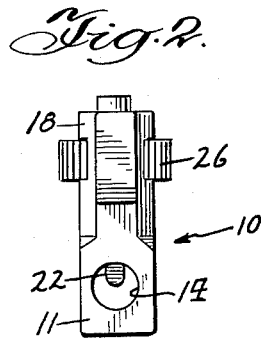
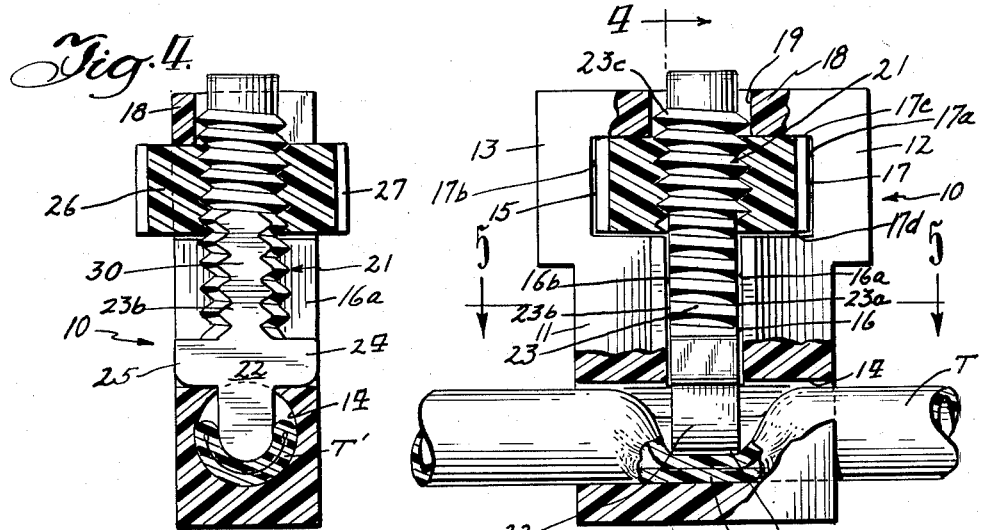
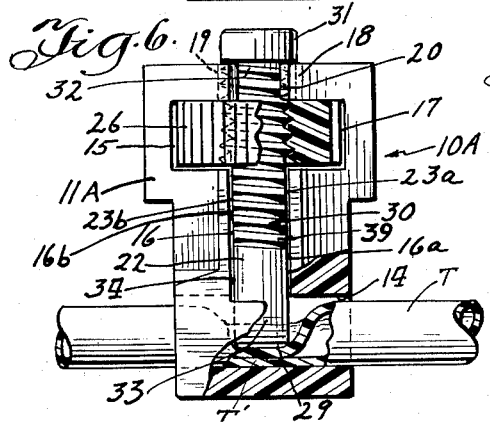
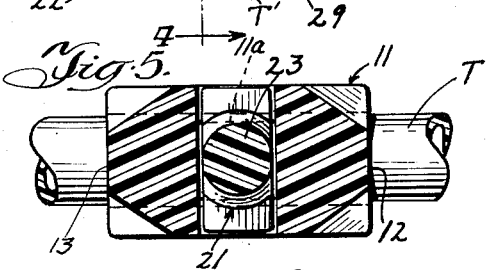
Inventor
Wilbert W. Redmer
By Joseph J. Grass
Attorney

United States Patent Office 3,167,085
Patented Jan. 26, 1965

3,167,085
FLOW REGULATING DEVICE
Wilbert W. Redmer, Barrington, Ill., assignor to Abbott Laboratories, North Chicago, Ill., a corporation of Illinois
Filed Feb. 12, 1962, Ser. No. 172,432
8 Claims. (Cl. 137—315)

This application is a continuation-in-part of my co-pending application Serial No. 828,497, filed July 21, 1959, and since abandoned.

This invention relates in general to a flow regulating device and in particular to a tubing clamp for regulating flow through a length of flexible tubing. The tubing clamp of the invention is particularly useful in regulating the flow of a liquid through flexible tubing employed in the administration of parenteral solutions and the collection of blood but the invention is not to be considered limited to these uses.

It is one of the purposes of the invention to provide a tubing clamp which is economical and simple to manufacture, which is dependable in its operation, and which is of a character to be operated easily by the thumb and index finger of one hand.

In accordance with the invention, there is provided a clamp body which receives a clamping member. The clamping member is received for axial movement in the clamp body. The clamping member has a tubing engaging portion and a threaded shank portion. The threaded shank portion threadably receives a rotatable nut. There is provided, in accordance with the invention, means for locking the nut against axial movement and for locking the clamping member against rotational movement.

There is, in accordance with the invention, a provision for limiting the movement of a clamping means axially of the clamp body so that no excessive pressure can be applied to the flexible tubing which is received by the clamp body. This is of particular importance in the event that an inexperienced operator attempts to apply excessive pressure to the tubing. The tubing clamp of the invention is so constructed that the pressure which can be applied to the tubing is limited. There is, more particularly, provided a construction which serves the dual function or both limiting the axial movement of the clamping means and of locking the clamping means against rotation.

Also in accordance with the invention, there is provided a modified form of the invention in which the threaded shank portion is provided with at least one flat surface whereby the clamping member is locked against rotation within the transverse opening. In the modified form of the invention there is also provided a construction which limits the axial movement of the clamping member.

In the diagrammatic drawing:

FIGURE 1 is a perspective view showing the tubing clamp of the invention and a fragmentary portion of a length of tubing which is received therein;

FIGURE 2 is a side elevation view of the tubing clamp of the invention;

FIGURE 3 is an elevation view, partly cutaway, of the tubing clamp showing the clamping member in maximum clamping engagement with the flexible tubing;

FIGURE 4 is a cross-sectional view taken along line 4—4 of FIGURE 3;

FIGURE 5 is a cross-sectional view taken along line 5—5 of FIGURE 3;

FIGURE 6 is a modified form of the tubing clamp of the invention.

Referring now to FIGURES 1 through 5 of the illustrative drawing, there is shown a tubing clamp generally indicated at 10. The tubing clamp 10 includes a clamp body 11 which has an opposed pair of outwardly tapering portions 12 and 13. A passage 14 in the clamp body 11 is adapted to receive a length of flexible tubing T. The clamp body 11 has what is shown to be a T-shaped transverse opening 15 therein. The transverse opening 15 is not to be considered to be limited to a T-shaped opening; any suitable transverse opening defined by the clamp body which enables the purposes of the invention to be accomplished is satisfactory. The transverse opening 15 includes a longitudinal opening portion 16 and an intersecting transverse opening portion 17. The longitudinal opening portion 16 is defined by parallel side walls 16a and 16b and an end wall 16c, while the transverse opening portion 17 is defined by opposed segmental side walls 17a and 17b and opposed end walls 17c and 17d. The end wall 17c defines the boundary of a neck 18 of the clamp body 11 which has an axial opening 19. The neck 18 has a restricted side opening 20. A clamping member 21 is axially received in the transverse opening 15 and is retained for sliding movement in the axial opening 19 of the neck 18.

The clamping member 21 includes a tubing engaging portion 22 and a threaded shank portion 23. The threaded shank portion 23 is shown to have over a portion of its length opposed flat surfaces 23a and 23b which lie adjacent side walls 16a and 16b, respectively. Since only slight clearance is provided between the side walls 16a and 16b and the flat surfaces 23a and 23b of the threaded shank portion 23 of the clamping member 21 the slidably mounted clamping member 21 is locked against rotation. The tubing engaging portion 22 contains what is shown to be a pair of opposed outwardly extending lugs 24 and 25 which limit the axial movement of the clamping member 21. The lugs 24 and 25 also serve to lock the clamping member 21 against rotation between the side walls 16a and 16b.

In the illustrated embodiments the clamp body is preferably composed of a flexible resilient material; however, in accordance with only one of the features of the invention only the neck 18 is required to be flexible and resilient.

The upper portion 23c of the threaded shank portion 23 is of greater width than the width of the restricted side opening 20 of the neck 18. Since the neck 18 is resilient the shank portion 23 is capable of being snapped through the restricted side opening 20 into the axial opening 19 of the neck 18.

A nut 26 is threadably received by the threaded shank portion 23. It is readily apparent that the nut 26 is rotatable within the transverse opening portion 17 and that the nut 26 is locked against axial movement by the end walls 17c and 17d of the clamp body 11. As the nut 26 is rotated by the operator the clamping member 21 is actuated axially. The outer surface of the nut 26 is preferably roughened as indicated at 27 to insure positive gripping. The threaded shank portion 23 and the nut 26 are each preferably provided with right-hand threads for convenience since most operators are right handed.

As is best shown in FIGURE 3 of the illustrative drawing, a localized portion T' of the tubing T is pinched to the maximum extent by a terminal end 29 of the tubing engaging portion 22. In this figure the lugs 24 and 25 are in abutment with the end wall 16b of the longitudinal opening portion 16. It is readily apparent that the operator is prevented from damaging the tubing T because of the operator's inability to exert further pressure on the tubing T. The clamp body 11 is provided with a bore 11a which axially guides the tubing engaging portion 22 of the clamping member 23.

Referring now to the embodiment of FIGURE 6 of the illustrative drawing, wherein the same reference characters have been employed to designate components having the same function, construction and relative location as in the embodiment of FIGURES 1 through 5, the tubing clamp is generally indicated at 10A. The clamping member 30 contains an annular lug 31 at its upper portion 32. The lug 31 limits the axial movement of the clamping member 30 upon abutment with the end of the clamp body 11A.

A threaded shank portion 39 of the clamping member 30 has opposed flat surfaces 23a and 23b which serve to lock the clamping member 30 against rotation. Only enough clearance is provided between the side walls 16a and 16b and the flat surfaces 23a and 23b in the embodiment of FIGURE 6 of the illustrative drawing to enable the clamping member 30 to move axially only. The tubing engaging portion 33 of the clamping member 30 is axially guided in a bore 34 in the clamp body 11A which is axially aligned with the longitudinal opening portion 16.

By way of specific example only and in no way intending to limit the invention each clamp body 11 and 11A and the clamping member 15 and its lugs 24 and 25, and the clamping member 30 and its lug 31 are composed of injection moldable nylon while the nut 26 in each embodiment of the invention is composed of high density polyethylene. Other suitable materials of construction are within the purview of the invention. Of course, it is to be understood that the feature of the invention whereby the upper portion of the threaded shank portion is snapped into the axial opening 19 of neck 18, requires the neck 18 to be resilient.

In assembling the tubing clamp 10 of the embodiment of FIGURES 1 through 5 of the illustrative drawing, the nut 26 is threaded onto the threaded shank portion 23. The clamping member 15 and the nut 26 which is threaded thereon are inserted into the transverse opening 15 and simultaneously the upper portion 23c of the threaded shank portion 23 is snapped through the restricted side opening 20 into the axial opening 19 in the neck 18. The tubing T is then inserted through the passage 14 in the clamp body 11 and the tubing clamp 10 of the invention is ready to be used.

In assembling the tubing clamp 10A of FIGURE 6 of the illustrative drawing, the clamping member 30 with the nut 26 threaded thereon is simply snapped through the restricted side opening 20 into the axial opening 19 in the neck 18. The tubing T is then inserted through the passage 14 in the clamp body 11 and the tubing clamp 10A of the invention is ready to be used.

In the embodiment of FIGURE 6 it is possible to omit the provision of the restricted side opening 20 in which case the nut 26 is first held axially within the transverse opening portion 17 and then the clamping member 30 is inserted through the axial opening 19 and is threaded into the aligned nut 26.

It is obvious that the tubing T does not form a part of the inventive combination.

The above-described embodiments being exemplary only, it is to be understood that modifications in form or detail can be made without departing from the spirit and scope of the invention. Accordingly, the invention is not to be considered as limited save as is consonant with the scope of the following claims.

What is claimed is:

1. A tubing clamp for regulating flow through a length of flexible tubing, comprising: a clamp body having a generally T-shaped transverse opening therein, said T-shaped transverse opening comprising a longitudinal opening portion and an intersecting transverse opening portion, said clamp body having a neck defining an axial opening in said clamp body communicating with said transverse opening portion, said neck having an axially coextensive restricted side opening, means for clamping the tubing against a portion of said clamp body including a tubing engaging portion having a threaded shank portion integral therewith, said threaded shank portion being axially received in said T-shaped transverse opening and retained for sliding movement in said axial opening of said neck, said threaded shank portion having a greater width at its upper portion than the width of said restricted side opening, said neck being sufficiently resilient to enable said threaded shank portion to be pressed through said restricted side opening, a nut threadably received by said threaded shank portion and disposed in said transverse opening portion and consequently being locked against axial movement, and means for locking said clamping means against rotation.

2. A tubing clamp for regulating flow through a length of flexible tubing, comprising: a clamp body having a transverse opening therein, said clamp body having a neck defining an axial opening in said clamp body communicating with said transverse opening, said neck having an axially coextensive restricted side opening, means for clamping the tubing against a portion of said clamp body including a tubing engaging portion having a threaded shank portion integral therewith, said threaded shank portion being axially received in said transverse opening and retained for sliding movement in said axial opening of said neck, said threaded shank portion having a greater width at its upper portion than the width of said restricted side opening, said neck being sufficiently resilient to enable said threaded shank portion to be pressed through said restricted side opening, a nut threadably received by said threaded shank portion and disposed in said transverse opening, means formed integrally with said clamp body for locking said nut against axial movement, and means for locking said clamping means against rotation.

3. A tubing clamp for restricting flow through a length of flexible tubing, comprising: a clamp body having a transverse opening therein, means disposed for axial movement in said transverse opening for clamping a localized portion of a length of flexible tubing, said clamping means including a tubing engaging portion having a threaded shank portion integral therewith, a nut threadably received by said threaded shank portion and locked against axial movement in said clamp body, and stop means mounted on said clamping means and engageable with said clamp body for limiting the axial movement of said clamping means, in the direction of said transverse opening to maintain a fixed minimum distance between the end of said bead and the bottom wall of said transverse opening whereby undue compression of tubing seated in said transverse opening is prevented.

4. The invention defined in claim 3 wherein said stop means includes at least one lug on said clamping means.

5. The invention defined in claim 3 wherein said stop means includes a lug on said threaded shank portion.

6. The invention defined in claim 3 wherein said stop means includes at least one lug on said tubing engaging portion.

7. A tubing clamp for restricting flow through a length of flexible tubing, comprising: a clamp body having a transverse opening defined by side walls, means disposed for axial movement in said transverse opening for clamping a localized portion of a length of flexible tubing, said clamping means including a tubing engaging portion having a threaded shank portion integral therewith, at least one flat portion on said threaded shank portion, said flat portion being engageable with one of said side walls for locking said threaded shank portion against rotation, a nut threadably received by said threaded shank portion and locked against axial movement in said clamp body, and stop means mounted on said clamping means engageable with said clamp body for limiting the axial movement of said clamping means, in the direction of said transverse opening to maintain a fixed minimum distance between the end of said bead and the bottom wall of said transverse opening whereby undue compression of tubing seated in said transverse opening is prevented.

8. A tubing clamp for restricting flow through a length of flexible tubing, comprising: a clamp body having a transverse opening therein, means disposed for axial movement in said transverse opening for clamping a localized portion of a length of flexible tubing, said clamping means including a tubing engaging portion having a threaded shank portion integral therewith, a nut threadably received by said threaded shank portion and locked against axial movement in said clamp body, and means for both limiting the axial movement of said clamping means in the direction of said transverse opening to maintain a fixed minimum distance between the end of said bead and the bottom wall of said transverse opening whereby undue compression of tubing seated in said transverse opening is prevented and for locking said clamping means against rotation.

References Cited in the file of this patent
UNITED STATES PATENTS

| | | |
|---|---|---|
| 1,475,755 | Dies | Nov. 27, 1923 |
| 1,498,805 | Oberman | June 24, 1924 |
| 2,250,117 | Noblitt | July 22, 1941 |
| 2,614,788 | Woodward | Oct. 21, 1952 |
| 2,889,848 | Redmer | June 9, 1959 |
| 2,908,476 | Hidding | Oct. 13, 1959 |

UNITED STATES PATENT OFFICE
CERTIFICATE OF CORRECTION

Patent No. 3,167,085                             January 26, 1965

Wilbert W. Redmer

It is hereby certified that error appears in the above numbered patent requiring correction and that the said Letters Patent should read as corrected below.

Column 1, line 44, for "or" read -- of --.

Signed and sealed this 6th day of July 1965.

(SEAL)
Attest:

ERNEST W. SWIDER                                     EDWARD J. BRENNER
Attesting Officer                                        Commissioner of Patents